US012210972B2

(12) United States Patent
Hong et al.

(10) Patent No.: US 12,210,972 B2
(45) Date of Patent: Jan. 28, 2025

(54) METHOD AND SYSTEM FOR EXTRACTING AND CORRECTING RINGING COMPONENT IN DYNAMIC PRESSURE MEASUREMENT SIGNAL OF SHOCK WAVE FLOW FIELD

(71) Applicant: WUHAN INSTITUTE OF TECHNOLOGY, Wuhan (CN)

(72) Inventors: Hanyu Hong, Wuhan (CN); Zhenjian Yao, Wuhan (CN); Yongsheng Li, Wuhan (CN); Deng Chen, Wuhan (CN); Liangchun Zhang, Wuhan (CN); Yaling Ji, Wuhan (CN); Jinlin Song, Wuhan (CN); Yanfei Chen, Wuhan (CN); Likun Huang, Wuhan (CN)

(73) Assignee: WUHAN INSTITUTE OF TECHNOLOGY, Wuhan (CN)

( * ) Notice: Subject to any disclaimer, the term of this patent is extended or adjusted under 35 U.S.C. 154(b) by 0 days.

(21) Appl. No.: 18/631,093

(22) Filed: Apr. 10, 2024

(65) Prior Publication Data

US 2024/0338562 A1    Oct. 10, 2024

(30) Foreign Application Priority Data

Apr. 10, 2023  (CN) .......................... 202310368863.3

(51) Int. Cl.
   *G06N 3/08*   (2023.01)
   *G01H 3/12*   (2006.01)
(52) U.S. Cl.
   CPC ............... *G06N 3/08* (2013.01); *G01H 3/125* (2013.01)

(58) Field of Classification Search
   CPC ................................ G06N 3/08; G01H 3/125
   See application file for complete search history.

(56) References Cited

U.S. PATENT DOCUMENTS

| 5,769,608 A | * | 6/1998 | Seale .................. F04B 53/1075 |
| | | | 417/413.1 |
| 2011/0239773 A1 | * | 10/2011 | Klosinski .............. G01L 9/0072 |
| | | | 73/724 |
| 2014/0100798 A1 | | 4/2014 | Guan et al. |
| 2016/0305835 A1 | * | 10/2016 | Kollias ..................... G01L 9/12 |
| 2016/0305997 A1 | * | 10/2016 | Wiesbauer ............ G01L 9/0072 |
| 2021/0278330 A1 | * | 9/2021 | Gharib ..................... G06N 3/08 |
| 2022/0345831 A1 | | 10/2022 | Jia et al. |
| 2023/0336340 A1 | | 7/2023 | Polleri et al. |
| 2024/0090877 A1 | * | 3/2024 | Moehring ................ A61B 8/12 |

* cited by examiner

*Primary Examiner* — Lina Cordero
*Assistant Examiner* — Lyudmila Zaykova-Feldman
(74) *Attorney, Agent, or Firm* — True Shepherd LLC; Andrew C. Cheng

(57) ABSTRACT

A method for extracting and correcting a ringing component in a dynamic pressure measurement signal of a shock wave flow field includes: adaptively decomposing a dynamic pressure measurement signal of a shock wave flow field through an empirical mode decomposition (EMD) method, and extracting a ringing component in the dynamic pressure measurement signal of the shock wave flow field; constructing a ringing component distortion correction model through a convolutional neural network (CNN) and a dataset through a staggered spanning dataset construction method; and predicting a time series of a segment with mode mixing in the ringing component, to accurately extract a ringing component in a dynamic pressure response signal. The method combines advantages of an adaptive signal decomposition method and a CNN model identification method.

8 Claims, 8 Drawing Sheets

METHOD AND SYSTEM FOR EXTRACTING AND CORRECTING RINGING COMPONENT IN DYNAMIC PRESSURE MEASUREMENT SIGNAL OF SHOCK WAVE FLOW FIELD

CROSS-REFERENCE TO RELATED APPLICATIONS

This application claims priority to Chinese Patent Application No. 202310368863.3 with a filing date of Apr. 10, 2023. The content of the aforementioned application, including any intervening amendments thereto, is incorporated herein by reference.

TECHNICAL FIELD

The present disclosure belongs to the technical field of signal processing, and specifically relates to a method and system for extracting and correcting a ringing component in a dynamic pressure measurement signal of a shock wave flow field.

BACKGROUND

Dynamic pressure in a shock tube exists widely in fields such as explosion testing, medical equipment, material impact testing, and aero-engines. Generation of the dynamic pressure in the shock tube is a transient dynamic process, which involves a complex test environment and is difficult to control. Consequently, it is difficult to accurately estimate a dynamic pressure signal, resulting in serious impact on measurement accuracy of the dynamic pressure signal.

The pressure sensor is a component for measuring dynamic pressure. It is essential to analyze and process the dynamic pressure measurement signal obtained through the pressure sensor. Extraction and elimination of a ringing component from a response signal are closely related to reconstruction accuracy of the dynamic pressure signal. Due to complexity of a noise component in the response signal, mode mixing occurs in a ringing component obtained through a traditional signal extraction method, leading to absence of a part of a ringing component signal.

SUMMARY OF PRESENT INVENTION

An objective of the present disclosure is to provide a method and system for extracting and correcting a ringing component in a dynamic pressure measurement signal of a shock wave flow field, to resolve a problem that mode mixing occurs in a ringing component obtained through a traditional signal extraction method.

The present disclosure adopts the following technical solutions.

A method for extracting and correcting a ringing component in a dynamic pressure measurement signal of a shock wave flow field is provided, including the following steps:
  S1: adaptively decomposing a dynamic pressure measurement signal of a shock wave flow field through an empirical mode decomposition (EMD) method, and extracting a ringing component in the dynamic pressure measurement signal of the shock wave flow field;
  S2: selecting series data of a continuous time series without mode mixing from the extracted ringing component, and decomposing the series data of the continuous time series without mode mixing into K equal-length continuous time subseries $m_k$, where k=1, 2, 3 ... K, and each subseries $m_k$ has d+1 pieces of series data and is expressed as follows:

$$m_k = n(k), n(k+1), n(k+2), \ldots n(k+d-1), n(k+d)$$

where n(k) represents a $k^{th}$ piece of series data of the continuous time series without mode mixing;
  S3: constructing a ringing component distortion correction model through a convolutional neural network (CNN), and training the ringing component distortion correction model with the d+1 pieces of series data of the subseries $m_k$ as an input feature of the model and a $(k+d+zt)^{th}$ piece of series data of the continuous time series without mode mixing as an output feature of the model, where zt represents a time span; and
  S4: acquiring a to-be-corrected dynamic pressure measurement signal of the shock wave flow field, performing EMD to find a first data point at which mode mixing occurs in the ringing component as a distortion point, constructing an input feature with a $(d+zt)^{th}$ data point before the distortion point as a start point, inputting the input feature to a trained ringing component distortion correction model to obtain distortion correction data, and replacing the distortion point with the distortion correction data; and repeating this step to obtain a final ringing component in a dynamic pressure response signal of the shock wave flow field.

According to the foregoing technical solution, S1 specifically includes the following steps:
  S11: Identify all local minimum points and local maximum points of the dynamic pressure measurement signal y(t) of the shock wave flow field.
  S12: Connect all local minimum points and connect all local maximum points through a cubic spline curve to obtain a lower envelope l(t) and an upper envelope u(t) of y(t) respectively, and calculate a mean value $m_1(t)$ of the upper envelope and the lower envelope:

$$m_1(t) = \frac{1}{2}(u(t) + l(t)) \quad (1)$$

S13: Subtract $m_1(t)$ from the signal y(t) to obtain a difference signal $h_1^{(1)}(t)$:

$$h_1^{(1)}(t) = y(t) - m_1(t) \quad (2)$$

When $h_1^{(1)}(t)$ meets two conditions of an intrinsic mode function (IMF), $h_1^{(1)}(t)$ is a first IMF component of y(t). Otherwise, $y(t)=h_1^{(1)}(t)$ and a calculation process in S11 to S13 is repeated for k' times until a difference signal $h_1^{(k')}(t)$ obtained at a $k'^{th}$ time meets the two conditions of the IMF, to obtain the first IMF component $c_1(t)$ of y(t):

$$c_1(t) = h_1^{(k')}(t) \quad (3)$$

S14: Subtract $c_1(t)$ from the signal y(t) to obtain a residual component $r_1(t)$:

$$r_1(t) = y(t) - c_1(t) \quad (4)$$

$y(t)=r_1(t)$ and a calculation process in S11 to S14 is repeated for i times to obtain an $i^{th}$ IMF component:

$$c_i(t) = r_{i-1}(t) - r_i(t) \quad i = 2, 3 \ldots\ldots h \quad (5)$$

$c_i(t)$ represents the $i^{th}$ IMF component. $r_i(t)$ represents a residual component obtained at an $i^{th}$ time.

The decomposition process is continued until a final residual component $r_m(t)$ becomes a monotonic function or contains only one extreme point. No IMF component is obtained by decomposing the final residual component $r_m(t)$. The dynamic pressure measurement signal y(t) is expressed as follows by combining the formulas (4) and (5):

$$y(t) = \sum_{i=1}^{h} c_i(t) + r_h(t) \quad (6)$$

The dynamic pressure measurement signal y(t) is decomposed into h IMF components imf(t) and one residual component r(t). Frequency bands of the components vary from high to low. The dynamic pressure measurement signal y(t) is finally expressed as follows:

$$y(t) = \sum_{i=1}^{m} imf_i(t) + r(t) \quad (7)$$

A correlation coefficient between each of the IMF components imf(t) obtained through EMD and the dynamic pressure measurement signal y(t) is calculated:

$$CC(i) = \frac{\sum_{n=1}^{N}(y(n) - \overline{y}(n))(c_i(n) - \overline{c}_i(n))}{\sqrt{\sum_{n=1}^{N}(y(n) - \overline{y}(n))^2 \sum_{n=1}^{N}(c_i(n) - \overline{c}_i(n))^2}} \quad (8)$$

y(n) represents a vibration signal. $c_i(n)$ represents a discrete signal corresponding to an $i^{th}$ IMF component. $\overline{y}(n)$ represents an average value of y(n). $\overline{c}_i(n)$ represents an average value of $c_i(n)$. N represents a signal length.

When the correlation coefficient between the $i^{th}$ IMF component and the dynamic pressure measurement signal is greater than or equal to a specified threshold, the $i^{th}$ IMF component is regarded as the ringing component z(t) of the dynamic pressure measurement signal.

According to the foregoing technical solution, the two conditions of the IMF are as follows:
(1) A quantity of extreme points and a quantity of zero crossing points in a dataset are equal or differ by at most one.
(2) The mean value of the upper envelope estimated through the local maximum points and the lower envelope estimated through the local minimum points is zero at any time.

According to the foregoing technical solution, the specified threshold is 60%.

According to the foregoing technical solution, the CNN includes an input layer, a convolutional layer, a pooling layer, a fully connected layer, and an output layer.

According to the foregoing technical solution, an input of the convolutional layer is $s(\tau, f) \in R^{A \times B}$. A and B respectively represent a length and a width of the input $s(\tau, f)$ of the input layer. An output $C_{cn}$ of the convolutional layer is expressed as follows:

$$C_{cn} = f(s(\tau, f) * \omega_{cn} + b_{cn}) \quad (9)$$

where * represents a convolution operation, $C_{cn}$ represents a $cn^{th}$ mapping, cn represents a quantity of filter kernels, $\omega_{cn}$ represents a weight matrix of a $cn^{th}$ filter kernel of the convolutional layer, $b_{cn}$ represents a bias of the $cn^{th}$ filter kernel, and $f(\bullet)$ represents a rectified linear unit (ReLU) activation function.

According to the foregoing technical solution, the pooling layer is expressed as follows:

$$P_{cn} = f(\beta \, down(C_{cn}) + b) \quad (10)$$

where $\beta$ represents a multiplicative bias term, $C_{cn}$ represents an input of the pooling layer, $down(C_{cn})$ represents a pooling operation, b represents an additive bias vector, and $f(\bullet)$ represents an activation function.

According to the foregoing technical solution, the fully connected layer is expressed as follows:

$$F(P_L) = f(\omega P + b) \quad (11)$$

where P represents an output of the pooling layer, $F(P_L)$ represents an output of the fully connected layer, $\omega$ represents a weight, b represents an additive bias vector, and $f(\bullet)$ represents an activation function.

According to the foregoing technical solution, series data of a continuous time series with a high ringing frequency and a large ringing amplitude and without mode mixing is selected to train the model.

The present disclosure further provides a system for extracting and correcting a ringing component in a dynamic pressure measurement signal of a shock wave flow field, including:
  a ringing component extraction module configured to adaptively decompose a dynamic pressure measurement signal of a shock wave flow field through an EMD method, and extract a ringing component in the dynamic pressure measurement signal of the shock wave flow field;
  a ringing component processing module configured to select series data of a continuous time series without mode mixing from the extracted ringing component, and decompose the series data of the continuous time series without mode mixing into K equal-length continuous time subseries $m_k$, where k=1, 2, 3 . . . K, and each subseries $m_k$ has d+1 pieces of series data and is expressed as follows:

$$m_k = n(k), n(k+1), n(k+2), \ldots n(k+d-1), n(k+d)$$

where n(k) represents a $k^{th}$ piece of series data of the continuous time series without mode mixing;
  a model construction and training module configured to construct a ringing component distortion correction model through a CNN, and train the model with the d+1 pieces of series data of the subseries $m_k$ as an input feature of the model and a $(k+d+zt)^{th}$ piece of series data of the continuous time series without mode mixing as an output feature of the model, where zt represents a time span; and a ringing component correction module configured to construct an input feature with a first data point at which mode mixing occurs in the ringing component as a distortion point and a $(d+zt)^{th}$ data point before the distortion point as a start point, input the input feature to the trained ringing component distortion correction model to obtain distortion correction data, and replace the distortion point with the distortion correction data; and repeat the step to obtain a final ringing component in a dynamic pressure response signal of the shock wave flow field.

Compared with the prior art, the present disclosure has the following beneficial effects:

Mode mixing that occurs in a process of extracting a ringing component through a traditional method is comprehensively considered in the present disclosure. Advantages of an adaptive signal decomposition method and a CNN model identification method are combined to propose a method for accurately extracting and correcting a ringing component in a dynamic pressure measurement signal of a shock wave flow field. In the method, a staggered spanning dataset construction method is adopted based on a periodic oscillatory attenuation characteristic of the ringing component and impact of mode mixing, to expand a sample size and increase prediction accuracy. To resolve problems such as absence of a part of a signal due to mode mixing, the ringing component distortion correction model is constructed through the CNN. In this way, mode mixing caused by signal decomposition is eliminated, and a complete ringing component is extracted.

DETAILED DESCRIPTION OF THE EMBODIMENTS

To make the objectives, technical solutions, and advantages of the present disclosure clearer, the present disclosure is further described in detail below with reference to the accompanying drawings and embodiments. It should be understood that the embodiments described herein are merely intended to explain but not to limit the present disclosure. Further, the technical features involved in the various embodiments of the present disclosure described below may be combined with each other as long as they do not constitute a conflict with each other.

Embodiment 1

Figure 1A:
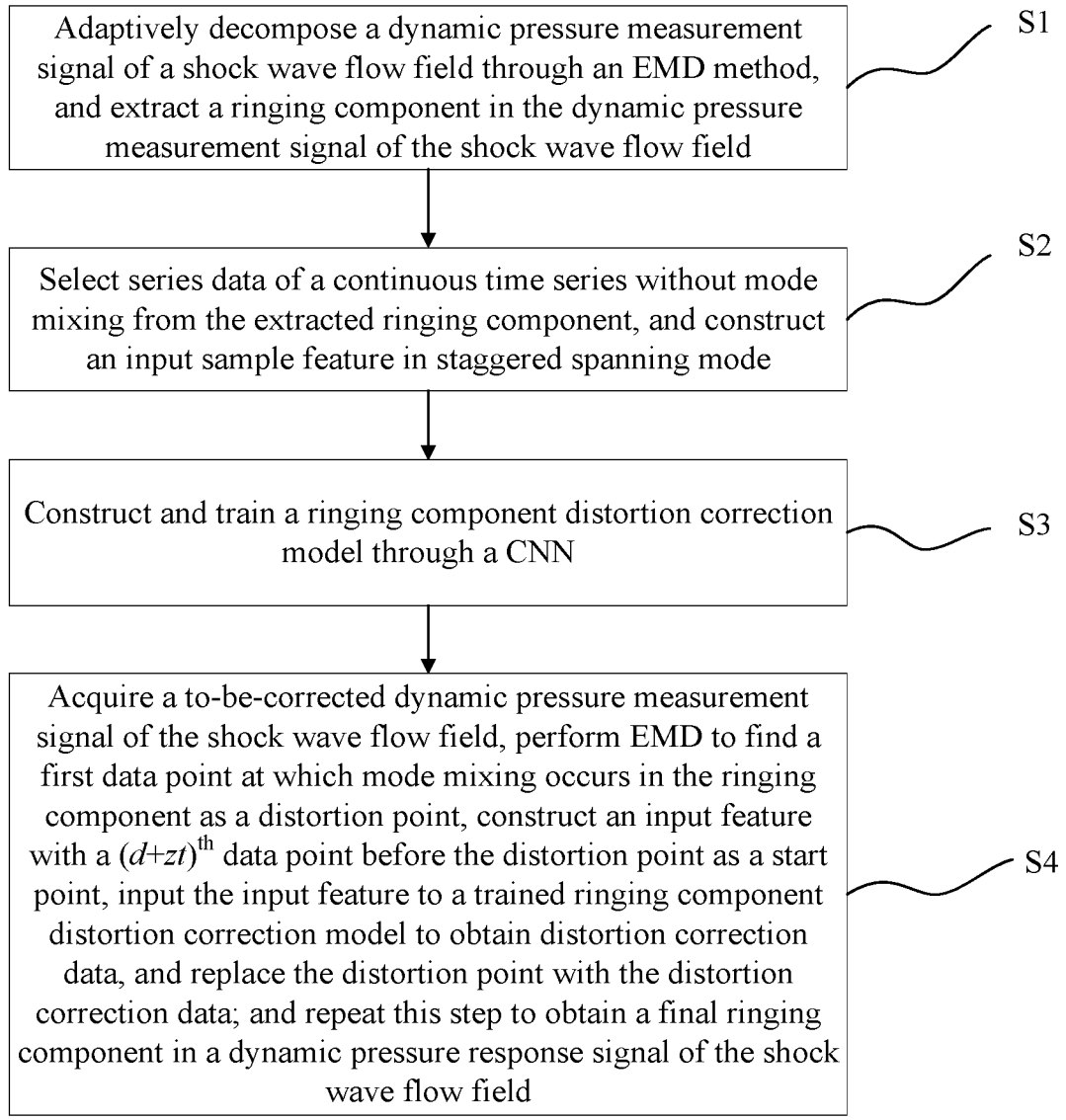
FIG. 1A is a flowchart showing a method for extracting and correcting a ringing component in a dynamic pressure measurement signal of a shock wave flow field according to Embodiment 1 of the present disclosure.
Figure 2:
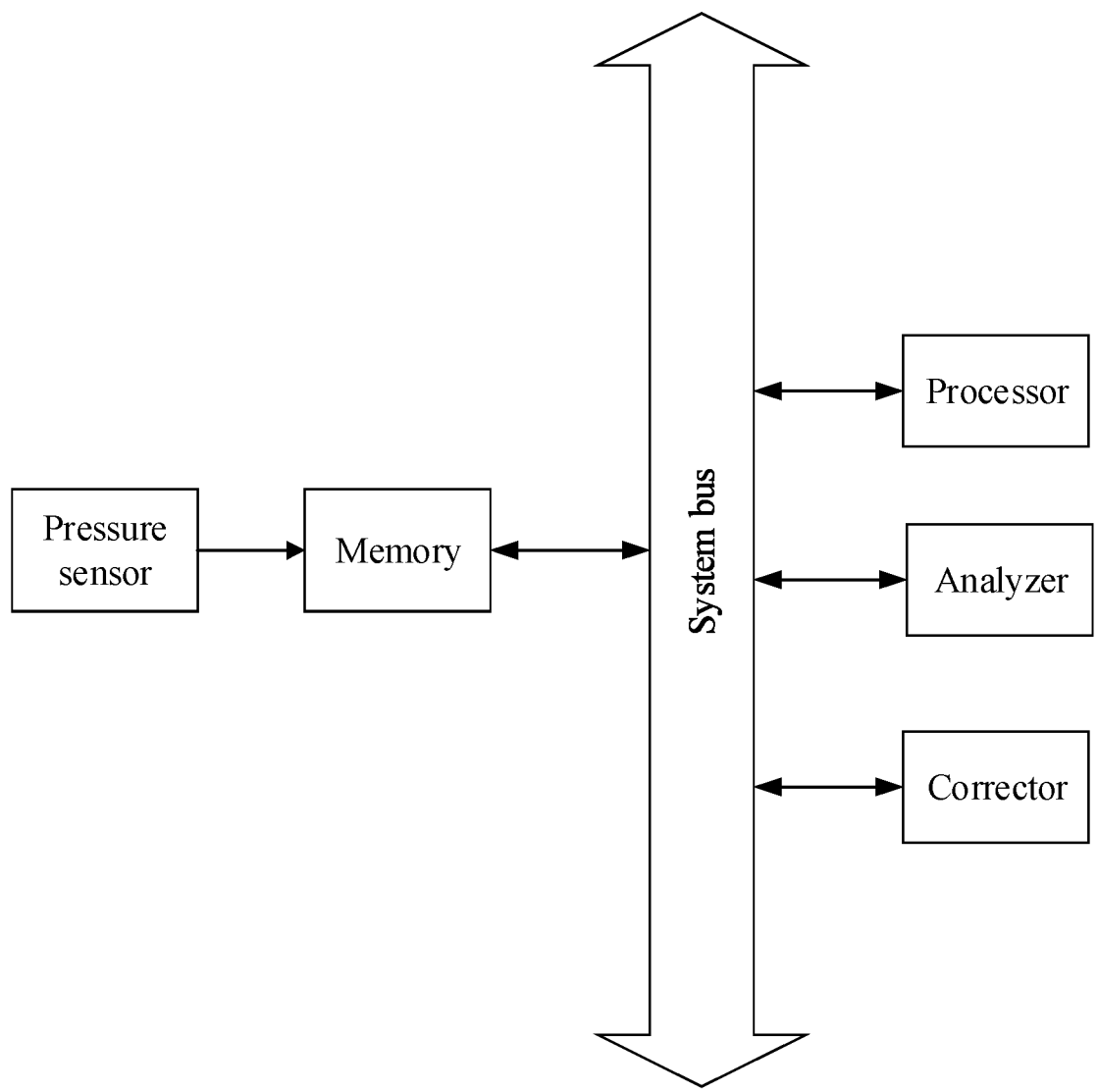
FIG. 2 is a schematic structural diagram showing a system for extracting and correcting a ringing component in a dynamic pressure measurement signal of a shock wave flow field according to an embodiment of the present disclosure.

As shown in FIG. 1A and FIG. 2, a method for extracting and correcting a ringing component in a dynamic pressure measurement signal of a shock wave flow field implemented through a computer according to an embodiment of the present disclosure mainly includes the following steps:

In S0, a pressure sensor measures a dynamic pressure signal of a shock wave flow field within a period of time. The shock wave flow field may be from an explosion test site, a material impact test site, or an aero engine test site.

In S1, the dynamic pressure signal of the shock wave flow field is received from the pressure sensor as a dynamic pressure measurement signal of the shock wave flow field. A processor connectable to the pressure sensor adaptively decomposes the dynamic pressure measurement signal of the shock wave flow field through an EMD method, and extracts a ringing component in the dynamic pressure measurement signal of the shock wave flow field.

In S2, an analyzer communicatively connectable to the processor selects series data of a continuous time series without mode mixing from the extracted ringing component, and decomposes the series data of the continuous time series without mode mixing into K equal-length continuous time subseries $m_k$, where k=1, 2, 3 . . . K. Each subseries $m_k$ has d+1 pieces of series data and is expressed as follows:

$$m_k = n(k), n(k+1), n(k+2), \ldots n(k+d-1), n(k+d)$$

where n(k) represents a $k^{th}$ piece of series data of the continuous time series without mode mixing.

In S3, a neural network-based corrector communicatively connectable to the analyzer constructs a ringing component distortion correction model through a CNN, and trains the ringing component distortion correction model with the d+1 pieces of series data of the subseries $m_k$ as an input feature of the model and a $(k+d+zt)^{th}$ piece of series data of the continuous time series without mode mixing as an output feature of the model, where zt represents a time span.

In S4, the pressure sensor acquires a to-be-corrected dynamic pressure measurement signal of the shock wave flow field. The processor performs EMD to obtain a ringing component in the dynamic pressure measurement signal of the shock wave flow field and finds a first data point at which mode mixing occurs in the ringing component as a distortion point. The analyzer uses a $(d+zt)^{th}$ data point before the distortion point as a start point and selects d pieces of subsequent data to construct an input feature, inputs the input feature to a ringing component distortion correction model trained by the corrector, to obtain distortion correction data, and replaces the distortion point with the distortion correction data. This step is repeated to obtain a final ringing component in a dynamic pressure response signal of the shock wave flow field. The dynamic pressure signal is synthesized through the corrected ringing component in the dynamic pressure response signal of the shock wave flow field, to improve measurement accuracy of the dynamic pressure signal.

Specifically, when the processor performs S1, it specifically includes the following steps:

In S11, all local minimum points and local maximum points of the dynamic pressure measurement signal y(t) of the shock wave flow field are identified.

In S12, all local minimum points and local maximum points are connected through a cubic spline curve to obtain a lower envelope l(t) and an upper envelope u(t) of y(t) respectively. A mean value $m_1(t)$ of the upper envelope and the lower envelope is calculated:

$$m_1(t) = \frac{1}{2}(u(t) + l(t)) \qquad (1)$$

In S13, $m_1(t)$ is subtracted from the signal y(t) to obtain a difference signal $h_1^{(1)}(t)$:

$$h_1^{(1)}(t) = y(t) - m_1(t) \qquad (2)$$

When $h_1^{(1)}(t)$ meets two conditions of an IMF, $h_1^{(1)}(t)$ is a first IMF component of y(t). Otherwise, $y(t)=h_1^{(1)}(t)$ and a calculation process in S11 to S13 is repeated for k' times until a difference signal $h_1^{(k')}(t)$ obtained at a $k'^{th}$ time meets the two conditions of the IMF, to obtain the first IMF component $c_1(t)$ of y(t):

$$c_1(t) = h_1^{(k')}(t) \qquad (3)$$

In S14, $c_1(t)$ is subtracted from the signal y(t) to obtain a residual component $r_1(t)$:

$$r_1(t) = y(t) - c_1(t) \qquad (4)$$

$y(t)=r_1(t)$ and a calculation process in S11 to S14 is repeated for i times to obtain an $i^{th}$ IMF component:

$$c_i(t) = r_{i-1}(t) - r_i(t) \quad i = 2, 3 \ldots h \qquad (5)$$

where $c_i(t)$ represents the $i^{th}$ IMF component, and $r_i(t)$ represents a residual component obtained at an $i^{th}$ time.

The decomposition process is continued until a final residual component $r_m(t)$ becomes a monotonic function or contains only one extreme point. No IMF component is obtained by decomposing the final residual component $r_m(t)$ at the moment. The dynamic pressure measurement signal y(t) is expressed as follows by combining the formulas (4) and (5):

$$y(t) = \sum_{i=1}^{h} c_i(t) + r_h(t) \qquad (6)$$

The dynamic pressure measurement signal y(t) is decomposed into h IMF components imf(t) and a residual component r(t). Frequency bands of the components vary from high to low. The dynamic pressure measurement signal y(t) is finally expressed as follows:

$$y(t) = \sum_{i=1}^{h} imf_i(t) + r(t) \qquad (7)$$

A correlation coefficient between each IMF component imf(t) obtained through EMD and the dynamic pressure measurement signal y(t) is calculated:

$$CC(i) = \frac{\sum_{n=1}^{N}(y(n)-\overline{y}(n))(c_i(n)-\overline{c}_i(n))}{\sqrt{\sum_{n=1}^{N}(y(n)-\overline{y}(n))^2 \sum_{n=1}^{N}(c_i(n)-\overline{c}_i(n))^2}} \qquad (8)$$

where y(n) represents a vibration signal, $c_i(n)$ represents a discrete signal corresponding to an $i^{th}$ IMF component, $\overline{y}(n)$ represents an average value of y(n), $\overline{c}_i(n)$ represents an average value of $c_i(n)$, and N represents a signal length.

When the correlation coefficient between the component and the dynamic pressure measurement signal is greater than or equal to a specified threshold, the component is regarded as the ringing component z(t) of the dynamic pressure measurement signal.

This embodiment mainly combines advantages of an adaptive signal decomposition method and a CNN model identification method. Impact of frequency mixing on a process of extracting the ringing component in the dynamic pressure response signal of the shock wave flow field can be effectively reduced. A data prediction model is constructed through a change feature of the ringing component. The ringing component in the dynamic pressure response signal of the shock wave flow field is accurately extracted and corrected.

Embodiment 2

A method for accurately extracting and correcting a ringing component in a dynamic pressure measurement signal of a shock wave flow field in the present disclosure includes the following steps:

In step (1), a dynamic pressure response signal is adaptively decomposed.

A dynamic pressure response signal (namely, a dynamic pressure measurement signal) of a shock tube is adaptively decomposed through an EMD method to obtain a series of components. A ringing component is identified and extracted based on a correlation between each component signal and the dynamic pressure response signal. A specific implementation process is as follows:

The dynamic pressure measurement signal y(t) of the shock tube is adaptively decomposed through the EMD method, which may be expressed as follows:

$$y(t) = \sum_{i=1}^{m} imf_i(t) + r(t) \qquad (1)$$

where i=1, 2, . . . , m, imf(t) represents an IMF component obtained by decomposing y(t), and r(t) represents a trend component.

A correlation coefficient between each component imf(t) and the dynamic pressure measurement signal y(t) is calculated. An irrelevant component is eliminated. The ringing component is extracted.

In step (2), a ringing component distortion correction model is constructed.

A dynamic pressure measurement signal of a shock wave flow field has a high frequency (ringing frequency of at least 300 kHz) and is non-stationary. When EMD is performed on the high-frequency and non-stationary signal, mode mixing often occurs. That is, the signal is seriously distorted in a partial time interval, resulting in low measurement accuracy of dynamic pressure of the shock wave flow field. Therefore, in the present disclosure, the ringing component in the dynamic pressure measurement signal of the shock wave flow field is first extracted. Then, a part of the ringing component without mode mixing is extracted as a correction sample.

For the ringing component extracted in step (1), a segment with a high ringing frequency and a large ringing amplitude and without mode mixing is selected to construct a distortion correction model dataset through a staggered spanning dataset construction method. Finally, the dataset is divided into a training set and a test set. A CNN-based ringing component distortion correction model is constructed. A specific implementation process is as follows:

For the ringing component extracted in step (1), due to an insufficient data sample size of the segment without mode mixing, it is impossible to use a neural network for a lot of training. In addition, it cannot be ensured that data close to a segment with mode mixing in the ringing component obtained through EMD is not affected by mode mixing. Considering a periodic oscillatory attenuation characteristic of the ringing component, interval prediction on the ringing component does not affect prediction accuracy. Therefore, the staggered spanning dataset construction method is proposed with full consideration of the periodic oscillatory attenuation characteristic of the ringing component and impact of mode mixing, to expand the sample size, increase prediction accuracy, enhance the distortion correction model dataset, and improve a distortion correction effect. It is assumed that data n of a continuous time series without mode mixing is selected and is decomposed into K equal-length continuous time subseries. Each subseries is $m_k$, where k=1, 2, 3 ... K. Each subseries $m_k$ has d+1 pieces of data and is expressed by formula (2):

$$m_k = n(k), n(k+1), n(k+2), \ldots n(k+d-1), n(k+d) \quad (2)$$

To ensure accuracy of prediction data, the d+1 pieces of data of $m_k$ are used as an input feature inp, and a $(k+d+zt)^{th}$ piece of series data is used as an output feature otp. zt represents a time span. Input and output of the first P subseries are defined as the training set. Input and output of the $(P+1)^{th}$ to $K^{th}$ subseries are defined as the test set. Therefore, input data of the training set and the test set is respectively (d+1)×P and (d+1)×(K−P), and output data is respectively 1×P and 1×(K−P). Finally, the input data is transformed into a CNN input mode and input to the neural network to construct the ringing component distortion correction model.

In step (3), a ringing component is extracted and corrected.

A time series of the segment with mode mixing is predicted through the ringing component distortion correction model constructed in step (2), to accurately extract the ringing component in the dynamic pressure response signal. A specific implementation process is as follows:

In the staggered spanning dataset construction method in step (2), with a data point at which mode mixing occurs as an end point and a $(d+zt)^{th}$ data point before the end point as a start point, a "first segment" with mode mixing in the ringing component is reconstructed through the dataset construction method in step (2) to obtain distortion correction data $z_1(t)$. Distortion data is replaced by the distortion correction data to complete distortion correction of zt data points in the first segment. With a last data point of $z_1(t)$ as an end point and a $(d+zt)^{th}$ data point before the end point as a start point, a dataset is constructed and input to the ringing component distortion correction model to reconstruct a "second segment" with mode mixing in the ringing component and obtain distortion correction data $z_2(t)$. By analogy, a missing segment of the ringing component in the dynamic pressure measurement signal of the shock tube is extracted. Finally, a reconstructed complete ringing component is obtained.

Embodiment 3

Figure 1B:
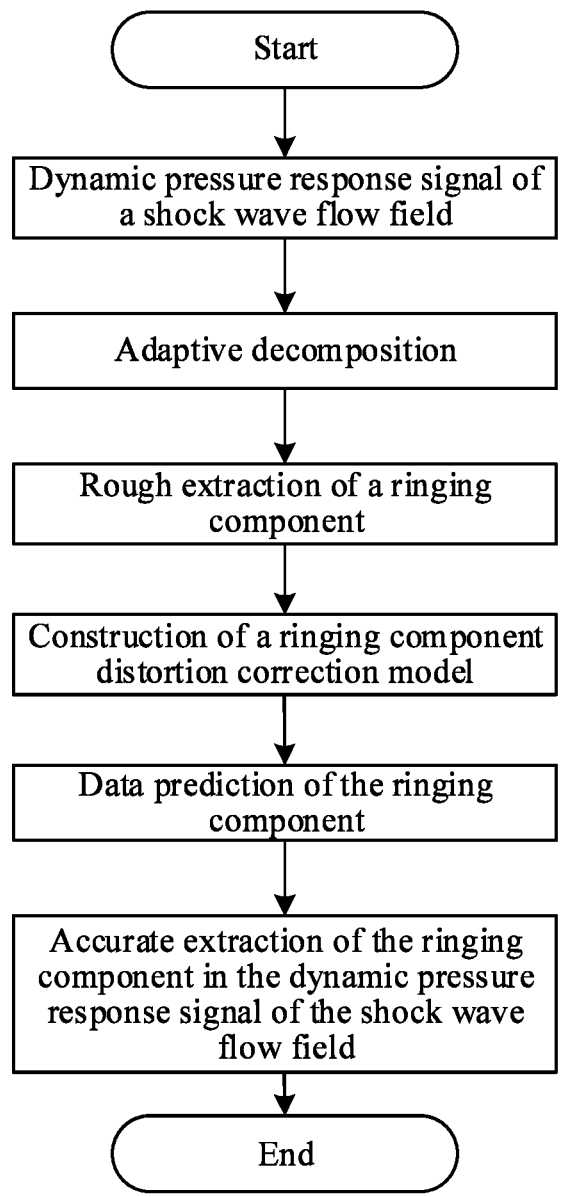
FIG. 1B is a flowchart showing a method for extracting and correcting a ringing component in a dynamic pressure measurement signal of a shock wave flow field according to Embodiment 3 of the present disclosure.

As shown in FIG. 1B, a method for accurately extracting and correcting a ringing component in a dynamic pressure measurement signal of a shock wave flow field according to an embodiment of the present disclosure includes the following steps:

In step (1), a dynamic pressure measurement signal is adaptively decomposed.

In step (2), a ringing component distortion correction model is constructed.

In step (3), a ringing component is extracted and corrected.

1. Adaptive Decomposition of a Dynamic Pressure Measurement Signal

EMD is performed on the dynamic pressure measurement signal y(t) to obtain a series of narrowband components, which are called IMF components. Each IMF component must meet the following two conditions: (1) A quantity of extreme points and a quantity of zero crossing points in a dataset are equal or differ by at most one. (2) A mean value of an upper envelope estimated through local maximum points and a lower envelope estimated through local minimum points is zero at any time. Basic steps of the decomposition are as follows:

In step (1), all local minimum points and local maximum points of the dynamic pressure measurement signal y(t) are identified.

In step (2), all local minimum points and local maximum points are connected through a cubic spline curve to obtain a lower envelope l(t) and an upper envelope u(t) of y(t) respectively. A mean value of the upper envelope and the lower envelope is calculated as follows:

$$m_1(t) = \frac{1}{2}(u(t) + l(t)) \quad (1)$$

In step (3), $m_1(t)$ is subtracted from the signal y(t) to obtain a difference signal as follows:

$$h_1^{(1)}(t) = y(t) - m_1(t) \quad (2)$$

When $h_1^{(1)}(t)$ meets the two conditions of an IMF, $h_1^{(1)}(t)$ is a first IMF component of y(t). Otherwise, $y(t)=h_1^{(1)}(t)$ and a calculation process in steps (1) to (3) is repeated for k' times until a difference signal $h_1^{(k')}(t)$ obtained at a $k'^{th}$ time meets the two conditions of the IMF, to obtain the first IMF component $c_1(t)$ of y(t):

$$c_1(t) = h_1^{(k')}(t) \tag{3}$$

In step (4), $c_1(t)$ is subtracted from the dynamic pressure measurement signal y(t) to obtain a residual component $r_1(t)$:

$$r_1(t) = y(t) - c_1(t) \tag{4}$$

$y(t)=r_1(t)$ and a calculation process in step (1) to (4) is repeated for i times to obtain an $i^{th}$ IMF component:

$$c_i(t) = r_{i-1}(t) - r_i(t) \quad i = 2, 3 \ldots h \tag{5}$$

The decomposition process is continued until a final residual component $r_m(t)$ becomes a monotonic function or contains only one extreme point. At the moment, no IMF component is obtained by decomposing the final residual component $r_m(t)$. The dynamic pressure measurement signal y(t) is expressed as follows by combining the formulas (4) and (5):

$$y(t) \sum\nolimits_{i=1}^{h} c_i(t) + r_h(t) \tag{6}$$

The dynamic pressure measurement signal y(t) is decomposed into h IMF components imf(t) and a residual component r(t). Frequency bands of the components vary from high to low. The dynamic pressure measurement signal y(t) is finally expressed as follows:

$$y(t) = \sum\nolimits_{i=1}^{m} imf_i(t) + r(t) \tag{7}$$

A correlation coefficient between each component imf(t) obtained through EMD and the dynamic pressure measurement signal y(t) is calculated:

$$CC(i) = \frac{\sum_{n=1}^{N}(y(n) - \overline{y}(n))(c_i(n) - \overline{c}_i(n))}{\sqrt{\sum_{n=1}^{N}(y(n) - \overline{y}(n))^2 \sum_{n=1}^{N}(c_i(n) - \overline{c}_i(n))^2}} \tag{8}$$

y(n) represents a vibration signal. $c_i(n)$ represents a discrete signal corresponding to an $i^{th}$ IMF component. $\overline{y}(n)$ represents an average value of y(n). $\overline{c}_i(n)$ represents an average value of $c_i(n)$. N represents a signal length.

According to a meaning of the correlation coefficient, if the correlation coefficient between the component and the dynamic pressure measurement signal is greater than or equal to 60%, the component is regarded as the ringing component z(t) of the dynamic pressure measurement signal.

2. Construction of a Ringing Component Distortion Correction Model

For the ringing component z(t) preliminarily extracted in step (1), due to an insufficient data sample size of a segment without mode mixing, it is impossible to use a neural network for a lot of training. In addition, it cannot be ensured that data close to a segment with mode mixing in the ringing component obtained through EMD is not affected by mode mixing. Considering a periodic oscillatory attenuation characteristic of the ringing component, interval prediction on the ringing component does not affect prediction accuracy. Therefore, a staggered spanning dataset construction method is proposed with full consideration of the periodic oscillatory attenuation characteristic of the ringing component and impact of mode mixing, to expand the sample size and increase prediction accuracy. To resolve problems such as absence of a part of a signal due to mode mixing, the ringing component distortion correction model is constructed through a CNN. In this way, mode mixing caused by signal decomposition is eliminated, and a complete ringing component signal is extracted. The CNN is a deep feedforward neural network, which is used to process data with a mesh structure. The CNN has a powerful feature extraction capability by constructing a plurality of filters, and extracts representative features from input data layers through the filters. Combining sparse connectivity with a parameter weight sharing mechanism to temporally and spatially downsample data dimensions greatly reduces a quantity of training parameters, effectively avoids overfitting of an algorithm, and provides superior performance in signal prediction.

The CNN includes an input layer, a convolutional layer, a pooling layer, a fully connected layer, and an output layer. Settings of the convolutional layer, the pooling layer, and the fully connected layer are essential.

A quantity of filter kernels may be defined for the convolutional layer as needed. In the convolutional layer, a kernel parameter is convolved with an input data point. Input of the convolutional layer is $s(\tau,f) \in R^{A \times B}$. A and B respectively represent a length and a width of input $s(\tau,f)$ of the input layer. Output $C_{cn}$ of the convolutional layer may be expressed as follows:

$$C_{cn} = f(s(\tau, f) * \omega_{cn} + b_{cn}) \tag{9}$$

\* represents a convolution operation. $C_{cn}$ represents a $cn^{th}$ mapping. cn represents the quantity of filter kernels. $\omega_{cn}$ represents a weight matrix of a $cn^{th}$ filter kernel of the convolutional layer. $b_{cn}$ represents a bias of the $cn^{th}$ filter kernel. $f(\bullet)$ represents a rectified linear unit (ReLU) activation function.

After processing through the convolutional layer, a quantity of dimensions of an output feature map increases. On this basis, the quantity of dimensions of the output feature map is reduced through the pooling layer. In the pooling layer, the quantity of dimensions of the feature map obtained after the processing through the convolutional layer may be reduced through max pooling, average pooling, or the like. The pooling process may be expressed as follows:

$$P_{cn} = f(\beta \text{down}(C_{cn}) + b) \tag{10}$$

where β represents a multiplicative bias term, $C_{cn}$ represents input, down ($C_{cn}$) represents a pooling operation, b represents an additive bias vector, and $f(\cdot)$ represents an activation function.

As with a traditional neural network, nonlinear fitting is performed on the input through a plurality of neurons of the fully connected layer. All neurons are connected to all data points of a feature map of a last pooling layer. The operation may be expressed as follows:

$$F(P_L) = f(\omega P + b) \quad (11)$$

where P represents an output of the pooling layer, $F(P_L)$ represents an output of the fully connected layer, ω represents a weight, b represents an additive bias vector, and $f(\cdot)$ represents an activation function.

In the method, input of a time series is converted into a matrix form. Input of a single matrix is [q×1×1]. A quantity of convolution kernels may be defined for the convolutional layer as needed. A size of the convolution kernel is defined as [p×1].

After the processing through the convolutional layer, the quantity of dimensions of the output feature map increases. Therefore, the quantity of dimensions of the output feature map is reduced through the pooling layer. Redundant features are reduced through a max pooling function to further avoid overfitting and reduce network parameters. In particular, because the size of the convolution kernel size is [p×1], a size of a pooling kernel is [k×1].

After a plurality of alternating convolution and pooling operations, an output matrix may be finally obtained by performing nonlinear fitting on the input through the plurality of neurons of the fully connected layer. A specific dataset construction process is as follows:

It is assumed that data n of a continuous time series without mode mixing is selected and is decomposed into K equal-length continuous time subseries. Each subseries is $m_k$, where k=1, 2, 3 .... K. Each subseries $m_k$ has d+1 pieces of data and is expressed by formula (12):

$$m_k = n(k), n(k+1), n(k+2), \ldots n(k+d-1), n(k+d) \quad (12)$$

To ensure accuracy of prediction data, the d+1 pieces of data of $m_k$ are used as an input feature inp, and a $(k+d+zt)^{th}$ piece of series data is used as an output feature otp. zt represents a time span. Input and output of the first P subseries are defined as the training set. Input and output of the $(P+1)^{th}$ to $K^{th}$ subseries are defined as the test set. Therefore, input data of the training set and the test set is respectively (d+1)×P and (d+1)×(K−P), and output data is respectively 1×P and 1×(K−P). Finally, the input data is transformed into a CNN input mode and input to the CNN to construct the ringing component distortion correction model.

For example, when k is equal to 1, d is equal to 4, and zt is equal to 2, a $7^{th}$ piece of time series data is obtained by using $1^{st}$, $2^{nd}$, $3^{rd}$, $4^{th}$, and $5^{th}$ pieces of time series data of the continuous time series without mode mixing. When k is equal to 2, d is equal to 4, and zt is equal to 2, an $8^{th}$ piece of time series data is obtained by using $2^{nd}$, $3^{rd}$, $4^{th}$, $5^{th}$, and $6^{th}$ pieces of time series data of the continuous time series without mode mixing.

3. Ringing Component Extraction and Correction

Due to limitations of the subseries length and the time span, it is impossible to predict a ringing component mode mixing signal at one time. A time series length of one prediction needs to be determined based on the subseries length and the time span.

In the staggered spanning dataset construction method in step (2), with a data point at which mode mixing occurs as an end point and a $(d+zt)^{th}$ data point before the end point as a start point, a "first segment" with mode mixing in the ringing component is reconstructed through the dataset construction method in step (2) to obtain distortion correction data $z_1(t)$. Distortion data is replaced by the distortion correction data to complete distortion correction of zt data points in the first segment. With a last data point of $z_1(t)$ as an end point and a $(d+zt)^{th}$ data point before the end point as a start point, a dataset is constructed and input to the ringing component distortion correction model to reconstruct a "second segment" with mode mixing in the ringing component and obtain distortion correction data $z_2(t)$.

By analogy, a missing segment $z_f(t)$ of a ringing component in a dynamic pressure measurement signal of a shock tube is finally extracted.

$$z_f(t) = \sum_{i=1}^{k} z_i(t) \quad (13)$$

Finally, a complete ringing component is reconstructed.

Embodiment 4

A system or apparatus for extracting and correcting a ringing component in a dynamic pressure measurement signal of a shock wave flow field according to an embodiment of the present disclosure is mainly configured to implement the foregoing method embodiments. The system or apparatus includes a memory, a ringing component extraction module, a ringing component processing module, a model construction and training module, and a ringing component correction module.

The memory is connected to a pressure sensor and configured to receive a dynamic pressure signal of a shock wave flow field acquired by the pressure sensor.

The ringing component extraction module is configured to adaptively decompose a dynamic pressure measurement signal of the shock wave flow field through an EMD method, and extract a ringing component in the dynamic pressure measurement signal of the shock wave flow field.

The ringing component processing module is configured to select series data of a continuous time series without mode mixing from the extracted ringing component, and decompose the series data of the continuous time series without mode mixing into K equal-length continuous time subseries $m_k$, where k=1, 2, 3 .... K. Each subseries $m_k$ has d+1 pieces of series data and is expressed as follows:

$$m_k = n(k), n(k+1), n(k+2), \ldots n(k+d-1), n(k+d)$$

where n(k) represents a $k^{th}$ piece of series data of the continuous time series without mode mixing.

The model construction and training module is configured to construct a ringing component distortion correction model through a CNN, and train the model with the d+1 pieces of series data of the subseries $m_k$ as an input feature of the model and a $(k+d+zt)^{th}$ piece of series data of the continuous time series without mode mixing as an output feature of the model. zt represents a time span.

The ringing component correction module is configured to construct an input feature with a first data point at which mode mixing occurs in the ringing component as a distortion point and a $(d+zt)^{th}$ data point before the distortion point as a start point, input the input feature to the ringing component distortion correction model to obtain distortion correction data, and replace the distortion point with the distortion correction data; and repeat the step to obtain a final ringing component in a dynamic pressure response signal of the shock wave flow field.

Each module of the system is mainly configured to implement method functions of the foregoing embodiments. Details are not described herein.

Embodiment 5

Figure 3:
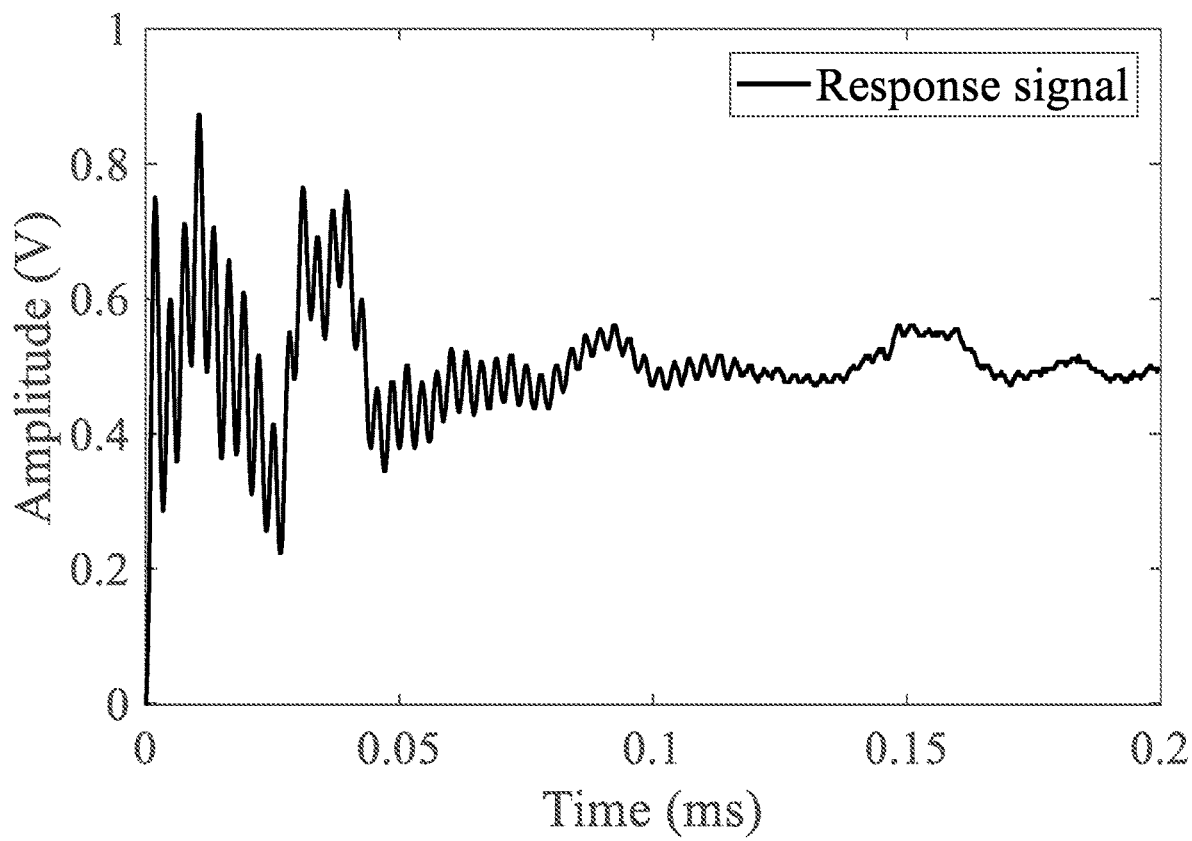
FIG. 3 is a diagram showing a response signal of a pressure sensor according to Embodiment 5 of the present disclosure.
Figure 4:
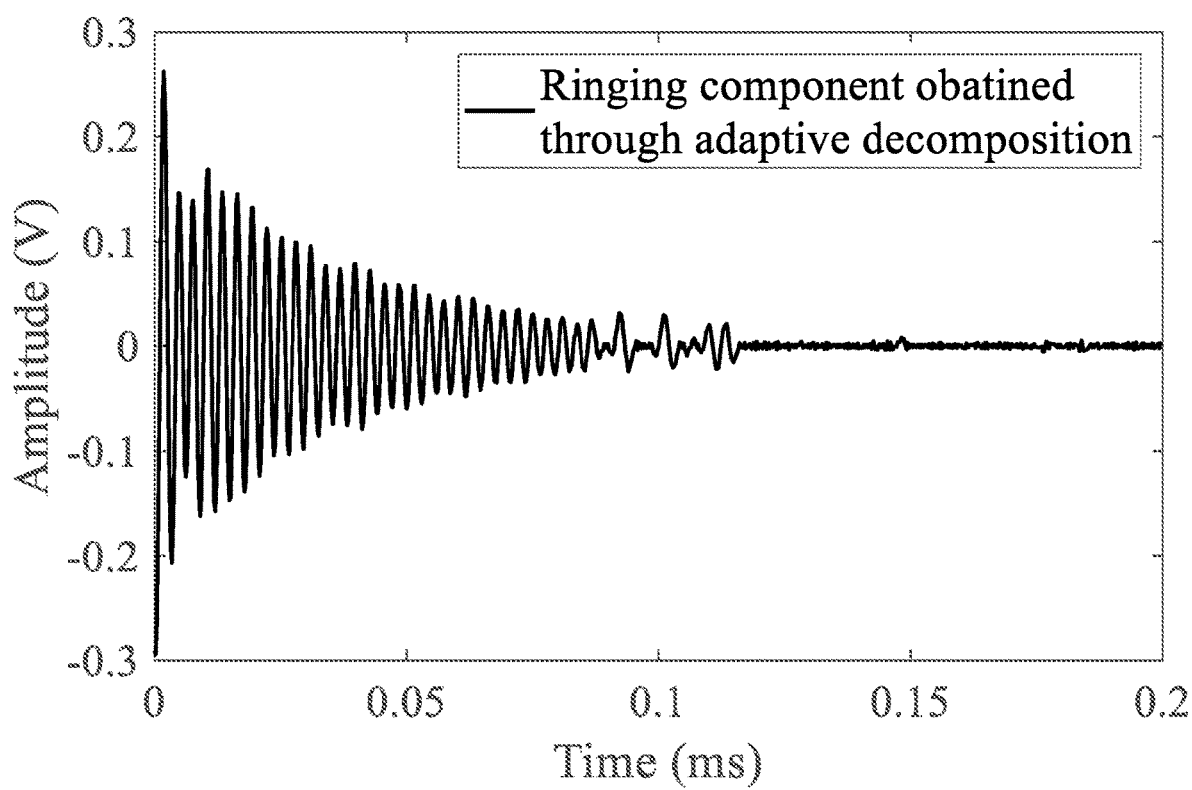
FIG. 4 is a diagram showing a ringing component extracted through adaptive decomposition according to Embodiment 5 of the present disclosure.
Figure 5:
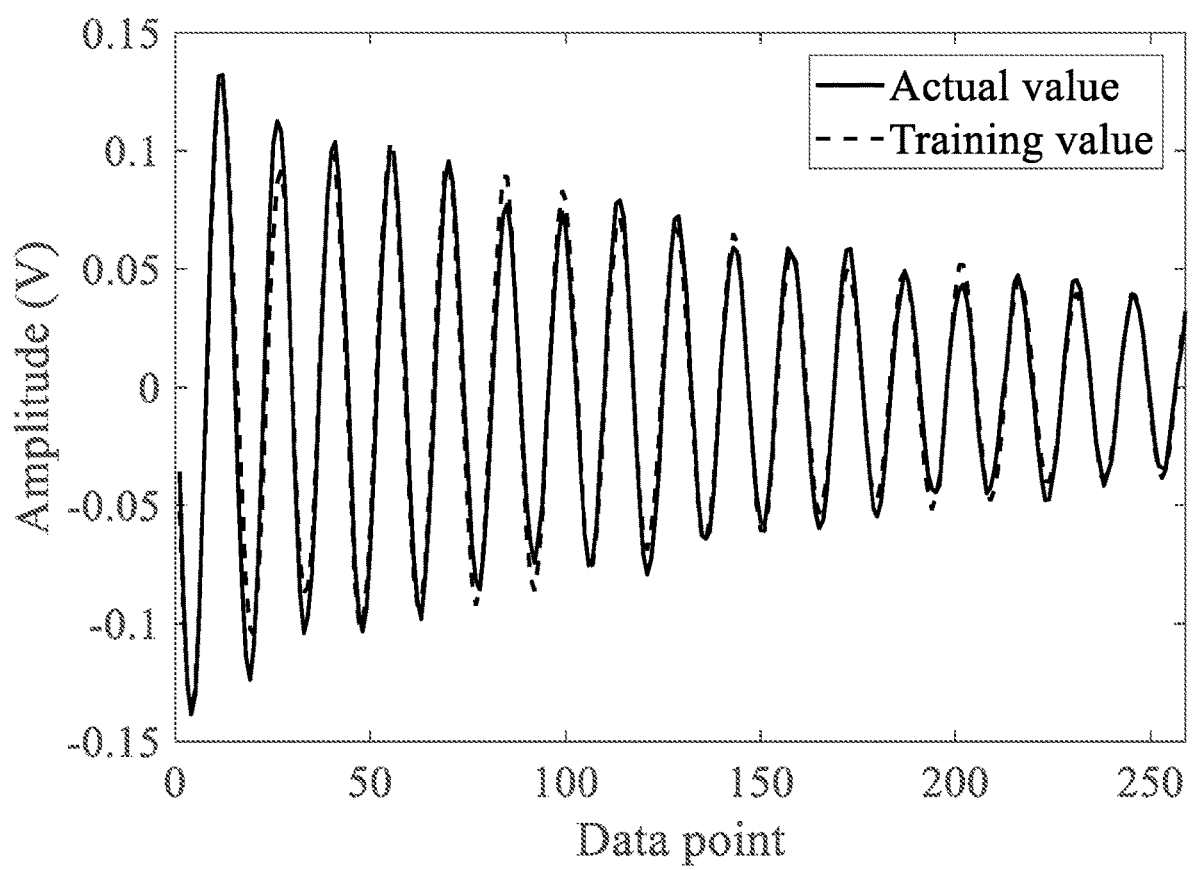
FIG. 5 is a diagram showing training results of a distortion correction model according to Embodiment 5 of the present disclosure.
Figure 6:
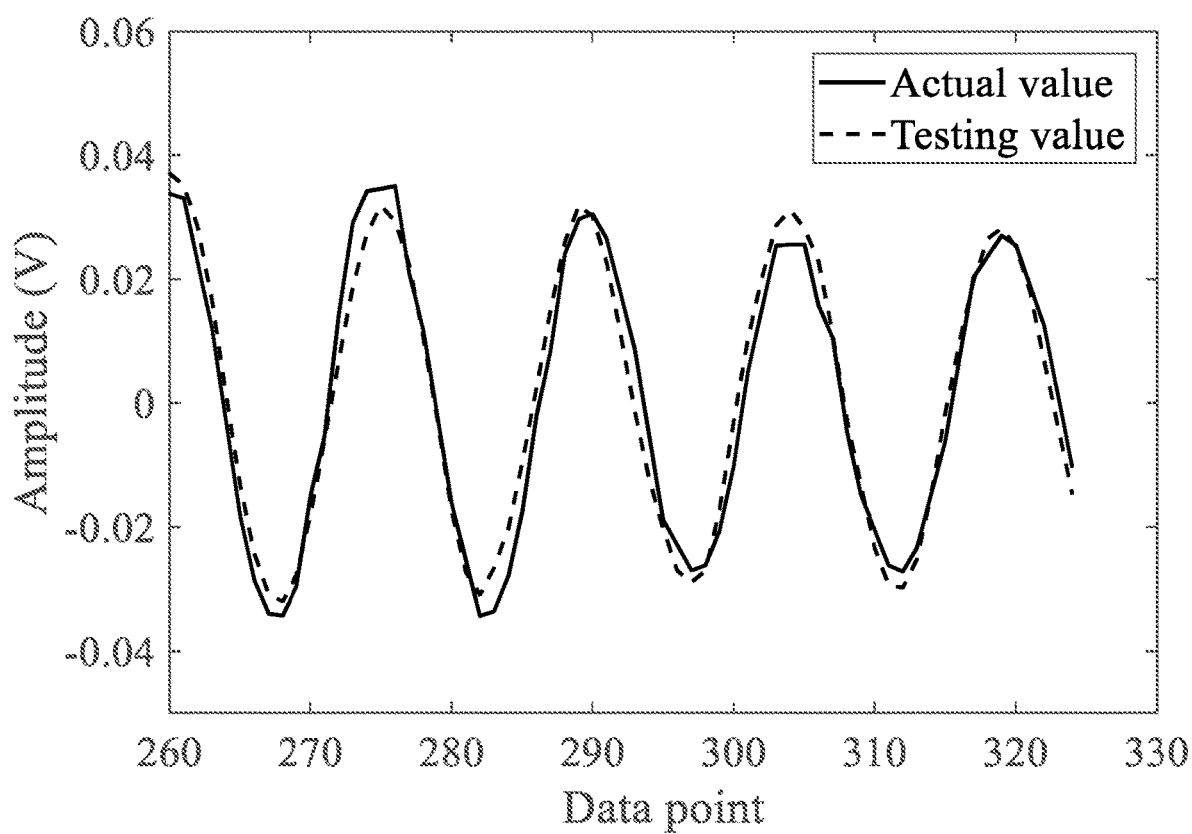
FIG. 6 is a diagram showing test results of a distortion correction model according to Embodiment 5 of the present disclosure.
Figure 7:
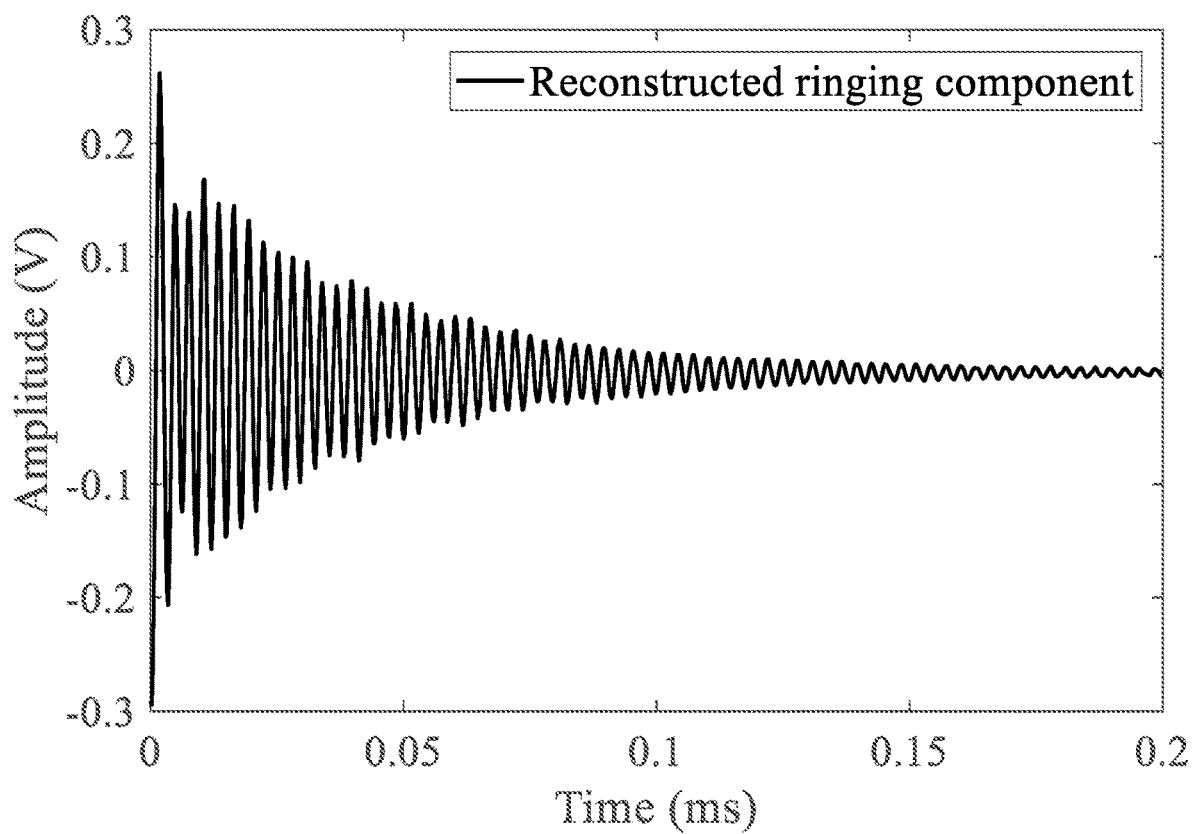
FIG. 7 is a diagram showing an extracted complete ringing component according to Embodiment 5 of the present disclosure.

Dynamic pressure response data generated by a shock tube system and measured by an ENDEVCO 8510B PR pressure sensor is analyzed below. A sampling frequency of the data is 5 MHz.
1. Raw measurement data of the ENDEVCO 8510B PR pressure sensor is shown in FIG. 3.
2. A response signal in FIG. 3 is adaptively decomposed through step (1) in Embodiment 3 to preliminarily extract a ringing component, as shown in FIG. 4.
3. A ringing component distortion correction model is obtained through step (2) in Embodiment 3. Training results are shown in FIG. 5. Test results are shown in FIG. 6.
4. A complete ringing component is extracted and corrected through step (3) in Embodiment 3, as shown in FIG. 7.

The foregoing method can effectively reduce impact of frequency mixing on a process of extracting a ringing component in a dynamic pressure response signal of a shock wave flow field. A data prediction model is constructed through a change feature of the ringing component. The ringing component in the dynamic pressure response signal of the shock wave flow field is accurately extracted.

Embodiment 6

The present application further provides a computer-readable storage medium, for example, a flash memory, a hard disk, a multimedia card, a card-type memory (such as a secure digital (SD) card or a data register (DX)), a random access memory (RAM), a static RAM (SRAM), a read-only memory (ROM), an electrically erasable programmable ROM (EEPROM), a programmable ROM (PROM), a magnetic memory, a magnetic disk, an optical disk, a server, or an application store. The computer-readable storage medium stores a computer program. The program, when executed by a processor, implements a corresponding function. When the program stored in the computer-readable storage medium is executed by the processor, the method for extracting and correcting a ringing component in a dynamic pressure measurement signal of a shock wave flow field is implemented.

It should be pointed out that based on needs of implementation, each step/component described in the present application may be divided into more steps/components, or two or more steps/components or some operations of the steps/components may be combined into a new step/component to achieve the objective of the present disclosure.

It is easy for those skilled in the art to understand that the foregoing descriptions are merely preferred embodiments of the present disclosure, and not intended to limit the present disclosure. Any modifications, equivalent replacements, improvements, and the like made within the spirit and principle of the present disclosure shall all fall within the protection scope of the present disclosure.

What is claimed is:

1. A method for extracting and correcting a ringing component in a dynamic pressure measurement signal of a shock wave flow field, comprising the following steps:

S0: measuring, by a pressure sensor, a dynamic pressure signal of the shock wave flow field within a period of time to obtain the dynamic pressure measurement signal, wherein the shock wave flow field is from an explosion test site, a material impact test site, or an aero engine test site;

S1: adaptively decomposing, by a processor connectable to the pressure sensor, the dynamic pressure measurement signal through an empirical mode decomposition (EMD) method, and extracting, by the processor, the ringing component in the dynamic pressure measurement signal of the shock wave flow field, which specifically comprises the following steps:

S11: identifying all local minimum points and local maximum points of the dynamic pressure measurement signal y(t) of the shock wave flow field;

S12: connecting all local minimum points and connecting all local maximum points through a cubic spline curve to obtain a lower envelope l(t) and an upper envelope u(t) of y(t) respectively, and calculating a mean value $m_1(t)$ of the upper envelope and the lower envelope:

$$m_1(t) = \frac{1}{2}(u(t) + l(t)) \qquad (1)$$

S13: subtracting $m_1(t)$ from the signal y(t) to obtain a difference signal $h_1^{(1)}(t)$:

$$h_1^{(1)}(t) = y(t) - m_1(t) \qquad (2)$$

when $h_1^{(1)}(t)$ meets two conditions of an intrinsic mode function (IMF), determining that $h_1^{(1)}(t)$ is a first IMF component of y(t); otherwise, letting $y(t)=h_1^{(1)}(t)$ and repeating a calculation process in S11 to S13 for k' times until a difference signal $h_1^{(k')}(t)$ obtained at a $k'^{th}$ time meets the two conditions of the IMF, to obtain the first IMF component $c_1(t)$ of y(t):

$$c_1(t) = h_1^{(k')}(t) \qquad (3)$$

S14: subtracting $c_1(t)$ from the signal y(t) to obtain a residual component $r_1(t)$:

$$r_1(t) = y(t) - c_1(t) \qquad (4)$$

letting y(t)=$r_1$(t) and repeating a calculation process in S11 to S14 for i times to obtain an $i^{th}$ IMF component:

$$c_i(t) = r_{i-1}(t) - r_i(t) \quad i = 2, 3 \ldots h \quad (5)$$

wherein $c_i$(t) represents the $i^{th}$ IMF component, and $r_i$(t) represents a residual component obtained at an $i^{th}$ time; continuing the decomposition process until a final residual component $r_m$(t) becomes a monotonic function or contains only one extreme point, wherein no IMF component is obtained by decomposing the final residual component $r_m$(t); and the dynamic pressure measurement signal y(t) is expressed as follows by combining the formulas (4) and (5):

$$y(t) = \sum_{i=1}^{h} c_i(t) + r_h(t) \quad (6)$$

wherein the dynamic pressure measurement signal y(t) is decomposed into h IMF components imf(t) and one residual component r(t), frequency bands of the components vary from high to low, and the dynamic pressure measurement signal y(t) is finally expressed as follows:

$$y(t) = \sum_{i=1}^{h} imf_i(t) + r(t) \quad (7)$$

calculating a correlation coefficient between each of the IMF components imf(t) obtained through EMD and the dynamic pressure measurement signal y(t):

$$CC(i) = \frac{\sum_{n=1}^{N}(y(n) - \bar{y}(n))(c_i(n) - \bar{c}_i(n))}{\sqrt{\sum_{n=1}^{N}(y(n) - \bar{y}(n))^2 \sum_{n=1}^{N}(c_i(n) - \bar{c}_i(n))^2}} \quad (8)$$

wherein y(n) represents a vibration signal, $c_i$(n) represents a discrete signal corresponding to an $i^{th}$ IMF component, $\bar{y}$(n) represents an average value of y(n), $\bar{c}_i$(n) represents an average value of $c_i$(n), and N represents a signal length; and
when the correlation coefficient between the $i^{th}$ IMF component and the dynamic pressure measurement signal is greater than or equal to a specified threshold, regarding the $i^{th}$ IMF component as the ringing component z(t) of the dynamic pressure measurement signal;
S2: selecting, by an analyzer communicatively connectable to the processor, series data of a continuous time series without mode mixing from the extracted ringing component, and decomposing the series data of the continuous time series without mode mixing into K equal-length continuous time subseries $m_k$, wherein k=1, 2, 3 . . . K, and each subseries $m_k$ has d+1 pieces of series data and is expressed as follows:

$$m_k = n(k), n(k+1), n(k+2), \ldots n(k+d-1), n(k+d)$$

wherein n(k) represents a $k^{th}$ piece of series data of the continuous time series without mode mixing;
S3: constructing a ringing component distortion correction model through a convolutional neural network (CNN), and training the ringing component distortion correction model with the d+1 pieces of series data of the subseries $m_k$ as an input feature of the model and a $(k+d+zt)^{th}$ piece of series data of the continuous time series without mode mixing as an output feature of the model to obtain a trained ringing component distortion correction model, wherein zt represents a time span; and
S4: finding, by the processor, a first data point at which mode mixing occurs in the ringing component as a distortion point, constructing an input feature with a $(d+zt)^{th}$ data point before the distortion point as a start point, inputting the input feature to the trained ringing component distortion correction model to obtain distortion correction data, and replacing the distortion point with the distortion correction data; repeating the step to obtain a final ringing component of the dynamic pressure measurement signal of the shock wave flow field; and reconstructing the dynamic pressure signal through the final ringing component to improve measurement accuracy of the pressure sensor.

2. The method according to claim 1, wherein the two conditions of the IMF are as follows:
(1) a quantity of extreme points and a quantity of zero crossing points in a dataset are equal or differ by at most one; and
(2) the mean value of the upper envelope estimated through the local maximum points and the lower envelope estimated through the local minimum points is zero at any time.

3. The method according to claim 1, wherein the specified threshold is 60%.

4. The method according to claim 1, wherein the CNN comprises an input layer, a convolutional layer, a pooling layer, a fully connected layer, and an output layer.

5. The method according to claim 4, wherein an input of the convolutional layer is s($\tau$, $f$)$\in R^{A \times B}$, A and B respectively represent a length and a width of the input s($\tau$, $f$) of the input layer, and an output $C_{cn}$ of the convolutional layer is expressed as follows:

$$C_{cn} = f(s(\tau, f) * \omega_{cn} + b_{cn}) \quad (9)$$

wherein * represents a convolution operation, $C_{cn}$ represents a $cn^{th}$ mapping, cn represents a quantity of filter kernels, $\omega_{cn}$ represents a weight matrix of a $cn^{th}$ filter kernel of the convolutional layer, $b_{cn}$ represents a bias of the $cn^{th}$ filter kernel, and $f(\cdot)$ represents a rectified linear unit (ReLU) activation function.

6. The method according to claim 4, wherein the pooling layer is expressed as follows:

$$P_{cn} = f(\beta \text{down}(C_{cn}) + b) \quad (10)$$

wherein $\beta$ represents a multiplicative bias term, $C_{cn}$ represents an input of the pooling layer, down ($C_{cn}$) represents a pooling operation, b represents an additive bias vector, and $f(\cdot)$ represents an activation function.

7. The method according to claim 4, wherein the fully connected layer is expressed as follows:

$$F(P_L) = f(\omega P + b) \quad (11)$$

wherein P represents an output of the pooling layer, $F(P_L)$ represents an output of the fully connected layer, $\omega$ represents a weight, b represents an additive bias vector, and $f(\cdot)$ represents an activation function.

8. The method according to claim 1, wherein series data of the continuous time series with a high ringing frequency and a large ringing amplitude and without mode mixing is selected to train the model.

* * * * *